United States Patent [19]

Tateoka

[11] 4,164,168

[45] Aug. 14, 1979

[54] VACUUM BOOSTER DEVICE

[75] Inventor: Kiyoshi Tateoka, Fujisawa, Japan

[73] Assignee: Tokico Ltd., Kawasaki, Japan

[21] Appl. No.: 782,783

[22] Filed: Mar. 30, 1977

[30] Foreign Application Priority Data

Apr. 13, 1976 [JP] Japan .................... 51-45727[U]

[51] Int. Cl.² ............................................. F15B 9/10
[52] U.S. Cl. ................................ 91/376 R; 91/369 B;
251/335 R
[58] Field of Search ............. 91/369 B, 369 A, 376 R,
91/369 R; 251/335 R, 335 A, 335 B; 137/627.5

[56] References Cited

U.S. PATENT DOCUMENTS

| 3,385,167 | 5/1968 | Wilson et al. | 91/369 B |
| 3,824,894 | 7/1974 | Nicholas | 91/369 B |
| 3,826,175 | 7/1974 | Thiel et al. | 91/369 B |

FOREIGN PATENT DOCUMENTS

| 2444622 | 4/1975 | Fed. Rep. of Germany | 91/369 B |
| 564094 | 6/1957 | Italy | 251/335 |

Primary Examiner—Paul E. Maslousky
Attorney, Agent, or Firm—Wenderoth, Lind & Ponack

[57] ABSTRACT

A vacuum booster device has a casing defining two chambers partitioned by a diaphragm, a valve body connected to the diaphragm, a plunger slidably and sealingly inserted in the valve body and connected to an input rod, two valve seats formed respectively on the valve body and the plunger, and a poppet valve for engaging and disengaging with the valve seats to connect or disconnect the two chambers and to connect one of the chambers to or disconnect it from the atmosphere. One end portion of the poppet valve is fitted and retained in the inner periphery of the valve body and has an annular projection on the outer periphery of the end portion for sealingly engaging with the valve body.

2 Claims, 3 Drawing Figures

VACUUM BOOSTER DEVICE

This invention relates to a vacuum booster device for use in a vehicle braking system, and particularly to a vacuum booster device of the type including a casing, a diaphragm dividing the interior of the casing into two chambers, one of the chambers being connected permanently to a source of vacuum, a valve body disposed in the casing and connected to the diaphragm, a plunger slidably and sealingly disposed in a bore or cylinder portion of the valve body and connected to an input rod, two valve seats formed respectively on the valve body and the plunger, and a poppet valve for engaging and disengaging with the valve seats to connect or disconnect the two chambers and to connect one of the chambers to or disconnect it from the atmosphere.

One example of the structure of vacuum booster device of the aforementioned type will be explained in conjunction with accompanying drawings, in which.

Figure 1:
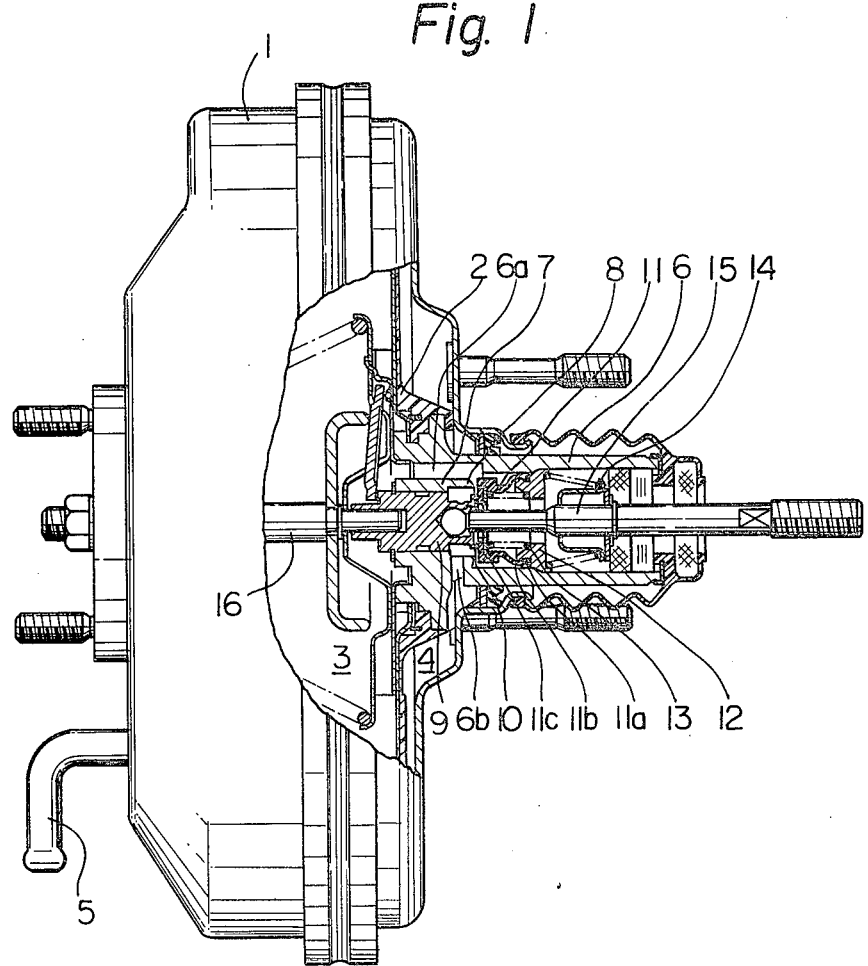
FIG. 1 is a longitudinal cross-sectional view of a vacuum booster device exemplifying the present invention.

The vacuum booster device shown in FIG. 1 is of the aforementioned type and comprises a casing 1 defining a front chamber 3 and a rear chamber 4 therein which are divided by a diaphragm 2. The front chamber 3 is connected permanently through a fitting 5 to a source of vacuum such as an intake manifold of an engine of a vehicle. A valve body 6 is secured to the diaphragm 2 and is slidably and sealingly received in the casing 1. A plunger 9 is slidably and sealingly fitted in a bore 7 formed in the valve body 6, and an input rod 15 is connected to the plunger 9.

A generally radial shoulder formed on the right hand end of the bore 7 defines an annular valve seat 8, and an annular valve seat 10 is defined on the right hand end of the plunger 9. The valve seat 10 is concentric with respect to the valve seat 8. A generally cup-shaped resilient poppet valve 11 is disposed to cooperate with the valve seats 8 and 10. The outer periphery of open end portion or a seal portion 11a of the cup-shaped poppet valve 11 engages sealingly with the inner periphery of the valve body 6 and is retained by a retainer 12. A bottom portion which is connected to the seal portion 11a through an intermediate flexible portion 11b acts as a valve portion 11c for contacting with or separating from the valve seats 8 and 10. A spring 13 is positioned between the retainer 12 and the valve portion 11c for urging the valve portion 11c leftward in the drawing.

Thus, in the unactuated condition of the booster device shown in FIG. 1, the valve portion 11c engages with the valve seat 10 of the plunger 9 which is connected to the input rod 15 and is urged rightward in the drawing by a coil spring 14 which urges the input rod 15 in the rightward direction. The front chamber 3 communicates with the rear chamber 4 through an axial passage 6a formed in the valve body 6, the clearance between the valve seat 8 and the valve portion 11c, and a radial passage 6b formed in the valve body 6. A space radially inward of the poppet valve 11 and to the right therefrom is connected with the atmosphere permanently, but the space is separated from the chambers 3 and 4 by the valve seat 10 engaging with the valve portion 11c.

When the input rod 15 is pressed leftward against the force of the spring 14, the valve portion 11c moves leftward flowing the movement of the plunger 9. The valve portion 11c will then engage with the valve seat 8 blocking the communication between the chambers 3 and 4. When the plunger 9 moves further in the same direction, the valve seat 10 separates from the valve portion 11c introducing atmosphere into the rear chamber 4 through the passage 6b. A differential pressure will act on the diaphragm 2 and a multiplied force will be transmitted to an output rod 16.

Figure 3:
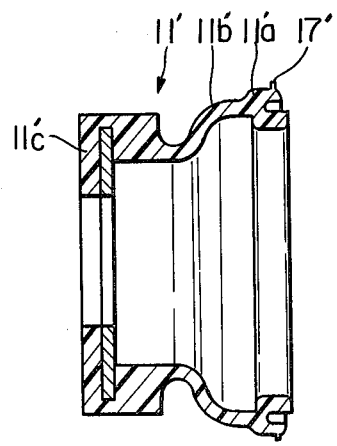
FIG. 3 is a view similar to FIG. 2, but showing a poppet valve of prior art.

In a vacuum booster device having the construction described, it has been the usual practice to form the poppet valve with a configuration as shown in an enlarged cross-sectional view in FIG. 3. The poppet valve 11' is usually formed of resilient material such as rubber or synthetic resin by a molding process. However, a burr or fin 17' has been sometimes formed on the outer periphery of the seal portion 11a by the action of the mold during casting. The fin 17' is large enough at some places to prevent formation of an air-tight seal between the inner periphery of the valve body 6 and the seal portion 11'a of the poppet valve 11' when the valve 11' is fitted into the valve body 6, whereby, the front chamber 3 is permanently communicated with the atmosphere, which cause deterioration of the working characteristics of the vacuum booster device.

Figure 2:
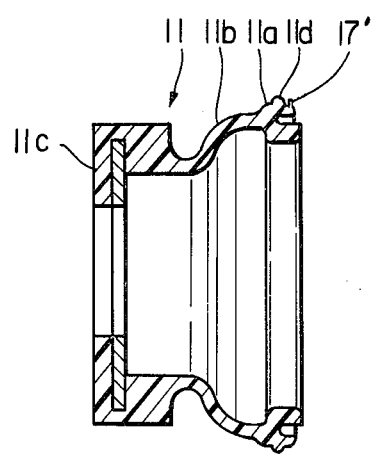
FIG. 2 is an enlarged cross-sectional view of the poppet valve incorporated in the vacuum booster device of FIG. 1.

The present invention seeks to remove the aforementioned shortcomings of prior art vacuum booster device. According to the present invention, the poppet valve 11 incorporated in the vacuum booster device of FIG. 1 is given a configuration as illustrated in FIG. 2. The poppet valve 11 of FIG. 2 has an annular projection 11d on the outer periphery of the seal portion 11a. The height of the projection 11d is made equal to or larger than the height of any burr or fin 17' which may be formed on the seal portion 11a during molding of the poppet valve 11 of a resilient material such as rubber or synthetic resin. When the poppet valve 11 is fitted in the valve body 6 of the vacuum booster device the annular projection 11d on the seal portion 11a will by an air tight engagement with the inner periphery of the valve body 6. Thus, it is possible to attain a good air-tight seal irrespective of the presence of a burr. Thus, a reliable vacuum booster device is obtained for use in avehicle braking system which is one of important systems in providing for safety of a vehicle.

What is claimed is:

1. A vacuum booster device comprising a casing having two chambers therein a diaphragm in said casing between said chambers and separating them, a valve body slidably and sealingly disposed in the casing and connected to the diaphragm, a plunger slidably and sealingly disposed in the valve body, an input rod connected to said plunger, two valve seats respectively on the plunger and the valve body, and a resilient poppet valve for engaging or disengaging with the valve seats for connecting the two chambers with one another or disconnecting them and for connecting one of the chambers with or disconnecting it from the atmosphere, one end portion of the poppet valve being shaped as a generally cylindrical seal portion and being sealingly fitted and retained in the inner periphery of the valve body, and an annular projection on the outer periphery of the seal portion having a base with a dimension less than the axial dimension of said seal portion and in sealingly engaging contact with the inner periphery of the valve body.

2. A vacuum booster according to claim 1 wherein said poppet valve seal portion has a burr thereon left during the process of forming the poppet valve, and said annular projection has a dimension radially of the poppet valve greater than that of the burr on the seal portion.

* * * * *